UNITED STATES PATENT OFFICE.

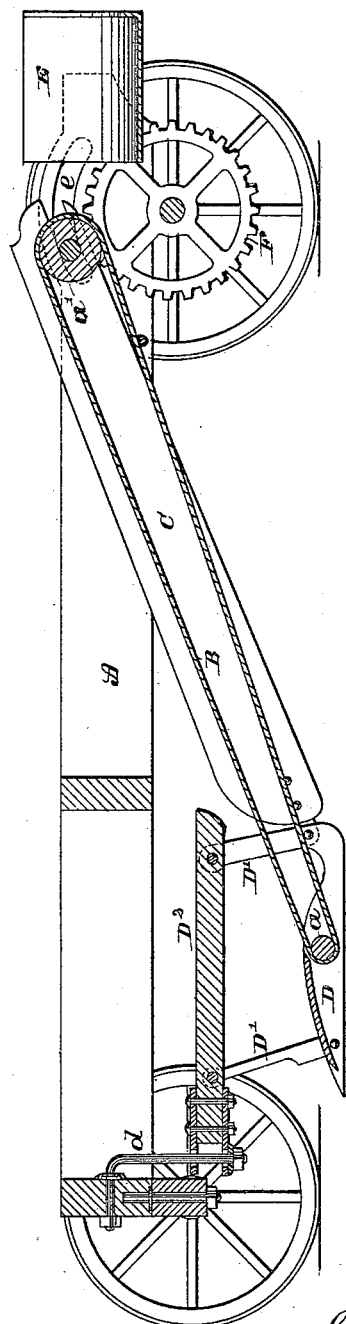

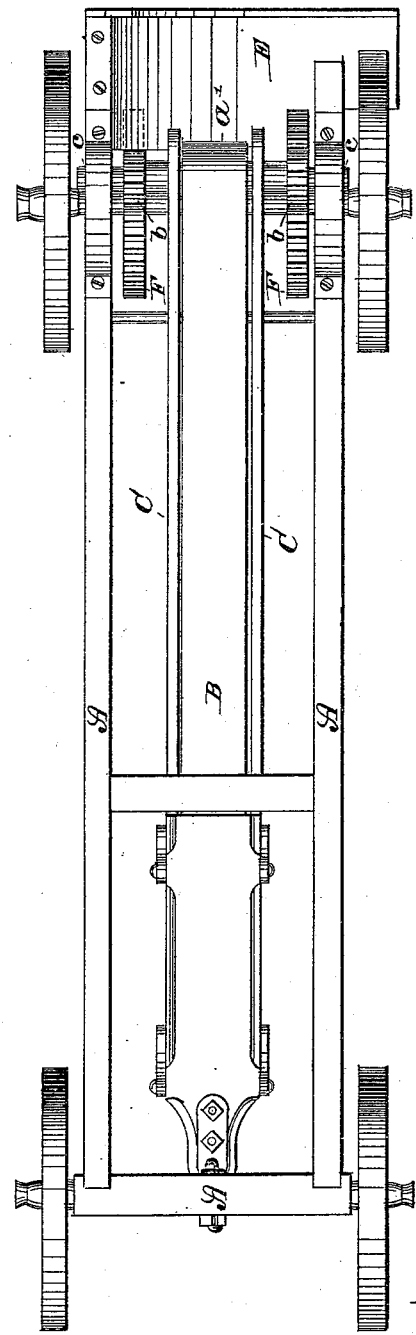

SAMUEL P. HUNTER, OF WELLINGTON, ILLINOIS.

EXCAVATOR.

SPECIFICATION forming part of Letters Patent No. 259,396, dated June 13, 1882.

Application filed July 19, 1881. (No model.)

*To all whom it may concern:*

Be it known that I, S. P. HUNTER, a citizen of the United States of America, residing at Wellington, in the county of Iroquois and State of Illinois, have invented certain new and useful Improvements in Excavators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification, and in which—

Figure 1 is a longitudinal vertical section of my invention, and Fig. 2 is a plan view.

This invention has reference to improvements in excavators, its object being to permit or effect the automatic adjustment of the elevating-apron as the plow sinks in cutting the excavation; and it consists in rendering the upper shaft of the elevating-apron, carrying the pinion gearing with the driving gearwheel, adjustable in the arc of a circle, and pivoting the lower end of the frame or side pieces to the excavating-plow, substantially as hereinafter more fully set forth.

Referring to the accompanying drawings, A is a frame suitably mounted upon running-gear and adapted to be drawn by a team.

B is the elevating endless apron for elevating the excavated earth, encompassing a lower roll, *a*, the axis of which is hung in and about midway the length of plow D, and an upper rear roll, *a'*, between the side pieces, C. The dirt taken from the plow D by the apron B is delivered upon a transverse downward-inclined chute or spout, E, affixed to the rear end of the machine, and adapted to deliver and discharge the dirt at one side of the excavation or machine.

The upper apron-roll, *a'*, whose shaft is supplied with a pinion, *b*, gearing with the gear-wheel F upon the rear axle of the driving and transporting wheels, has its said shaft extended, as at *c*, and adapted to rest in segmental slots *e*, formed preferably as shown in or upon the upper edges of the sides of the frame A.

The lower forward end of the apron-frame is pivoted or loosely connected to the rear edges of the plow D, to permit of flexibility between them to allow of the necessary movement during the excavating process or the sinking of the plow.

It will be noticed that as the plow sinks in cutting the ditch the desired depth the upper end or roll of the elevating-apron will adjust itself automatically to the required inclination, and thus effect the adjustment of the apron to keep it in continuous operation.

The plow D, preferably of the form shown, is connected by the arms D' to a beam, D², in an inclined position to give it the required dip. The beam D² is connected to and adapted to move vertically upon a bolt, *d*, depending from the forward end of the frame A, to allow the plow to sink with the increasing depth of the excavation.

I am aware that it is old to employ a vertically-adjustable plow and a carrier-frame pivoted to the plow, as well as to effect the adjustment in the arc of a circle of the upper carrier-roll.

I claim and desire to secure by Letters Patent—

In an excavator, the combination, with the side pieces or frame, C, having the carrier B, the shaft of the upper roll thereof having a pinion, *b*, gearing with wheel F on the driving-wheel shaft, of the frame A, having curved slots *e*, and the plow D, connected by arms D' to a beam, D², adapted to move vertically upon a depending bolt, *d*, at the front end of the frame A, substantially as and for the purpose specified.

In testimony whereof I affix my signature in presence of two witnesses.

SAMUEL P. HUNTER.

Witnesses:
THOMPSON EVANS,
R. M. HAMILTON.